US007764167B2

(12) United States Patent
Reeves et al.

(10) Patent No.: US 7,764,167 B2

(45) Date of Patent: Jul. 27, 2010

(54) MONITORING MOVEMENT OF AN ENTITY IN AN ENVIRONMENT

(75) Inventors: Andrew Reeves, Ipswich (GB); Mark Buckland, Brighton (GB)

(73) Assignee: British Telecommunications plc, London (GB)

( * ) Notice: Subject to any disclaimer, the term of this patent is extended or adjusted under 35 U.S.C. 154(b) by 626 days.

(21) Appl. No.: 11/354,240

(22) Filed: Feb. 15, 2006

(65) Prior Publication Data

US 2007/0176760 A1 Aug. 2, 2007

(30) Foreign Application Priority Data

Jan. 18, 2006 (EP) ................................ 06250266

(51) Int. Cl.
*B60R 25/10* (2006.01)

(52) U.S. Cl. ............................ 340/426.22; 340/573.4; 340/573.1

(58) Field of Classification Search ............. 340/545.1, 340/573, 574, 573.4, 523, 573.1, 540, 541, 340/426.22

See application file for complete search history.

(56) References Cited

U.S. PATENT DOCUMENTS 4,899,683 A 2/1990 Cuffaro
5,153,560 A * 10/1992 Ichikawa .................... 340/522
5,218,344 A * 6/1993 Ricketts ................... 340/573.4
6,002,994 A 12/1999 Lane et al.
6,225,906 B1 * 5/2001 Shore ...................... 340/573.4
6,232,877 B1 * 5/2001 Ashwin ................... 340/572.1
6,339,375 B1 * 1/2002 Hirata et al. ................ 340/541
6,753,782 B2 6/2004 Power
6,801,640 B1 * 10/2004 Okubo et al. ............... 382/118
6,940,406 B2 * 9/2005 Sata ........................... 340/552
7,421,097 B2 * 9/2008 Hamza et al. ............... 382/118
2002/0060630 A1 5/2002 Power
2002/0067259 A1 * 6/2002 Fufidio et al. ............... 340/541
2003/0210149 A1 11/2003 Reisman et al.
2004/0017929 A1 * 1/2004 Bramblet et al. ............ 382/103
2004/0030531 A1 2/2004 Miller et al.
2004/0153671 A1 * 8/2004 Schuyler et al. ............. 713/201
2004/0183667 A1 * 9/2004 Nicoletti et al. ............. 340/506

(Continued)

FOREIGN PATENT DOCUMENTS

EP 1349128 A2 10/2003

(Continued)

OTHER PUBLICATIONS

Dementia and Wandering—Fact Sheet from The Better Health Channel, Dept. of Human Services, Victoria, Australia, 2004, www.betterhealth.vic.gov.au.

(Continued)

*Primary Examiner*—Davetta W Goins
*Assistant Examiner*—Hoi C Lau
(74) *Attorney, Agent, or Firm*—Nixon & Vanderhye PC

(57) ABSTRACT

Whether a person suffering dementia has left their flat unaccompanied can be determined by identifying an event indicating opening of the front door of the flat, determining whether the flat was occupied by more than one person prior to the door opening, determining whether there is inactivity in the flat following the door opening and sending a notification to a communications terminal of a caretaker if the flat was occupied by only one person and if there is inactivity in the flat.

23 Claims, 11 Drawing Sheets

U.S. PATENT DOCUMENTS

2005/0264414 A1* 12/2005 Sweeney .................... 340/522
2007/0268145 A1* 11/2007 Bazakos et al. .......... 340/573.1

FOREIGN PATENT DOCUMENTS

| | | | |
|---|---|---|---|
| EP | 1400939 | A1 | 3/2004 |
| GB | 2348725 | A | 10/2000 |
| JP | 2001-134872 | | 5/2001 |
| JP | 2002-319083 | | 10/2002 |

OTHER PUBLICATIONS

Kennard, Christine. "Causes of Wandering in Alzheimer's Disease." About, Inc., Jan. 12, 2006. http://alzheimers.about.com/od/what-toexpect/a/causes_wander_p. htm.

Reeves, A. A., et al. "Remote Monitoring of Patients Suffering From Early Symptoms of Dementia." Proceedings of the International Workshop on Wearable and Implantable Body Sensor Networks, Imperial College, London, United Kingdom. Apr. 12-13, 2005.

InfraRed Integrated Systems Ltd. (IRISYS). "IRISYS People Counter Family." IPU 40019, May 2002.

Biodata Ltd. "Video Turnstile People Counting Systems from Biodata Ltd.—How it Works: People Counting Configurations." Product information, updated May 4, 2006. http://www.videoturnstile.com/config.html.

Barger, Tracy et al. "Objective Remote Assessment of Activities of Daily Living: Analysis of Meal Preparation Patterns." Medical Automation Research Center, University of Virginia Health System, Carilion Biomedical Institute. Poster Presentation, 2002.

Mozer, Michael, et al. "The Neural Network House: An Overview." In *Current Trends in Connectionism*. Erlbaum, L. Niklasson & M. Boden, eds., Hillsdale, New Jersey, pp. 371-380, 1995.

Tapia, Emmanual Munguia, et al. "Activity Recognition in the Home Using Simple and Ubiquitous Sensors." Pervasive Computing, Second International Conference, Pervasive 2004, Vienna, Austria, Apr. 21-23, 2004, Proceedings. Lecture Notes in Computer Science, vol. 3001, Springer, Alois Ferscha & Friedemann Mattern, eds., pp. 158-175, 2004.

Patterson, Donald J., et al. "Sporadic State Estimation for General Activity Inference." Technical Report. American Association for Artificial Intelligence. 2004.

Yahoo! Mobile for UK & Ireland. Yahoo WAP site info. Yahoo! Inc., 2006, http://uk.mobile.yahoo.com/info/wap/.

Living Independently Group, Inc. "QuietCare® puts its powerful technology to work protecting seniors at home." Product information, 2004, http://www.quietcaresystems.com/how_it_works.htm.

Teis—UK Telemedicine and E-health Information Service. "Development of Devices for Use in a Smart House for People with Dementia (Gloucester Smart House)." Project Information (Dr. Roger Orpwood—Project Contact), Mar. 2004, University of Portsmouth and NHS Information Authority. http://www.teis.nhs.uk/jsp/search/activity.jsp?proiect=1327.

Koester, Robert J., M.S. "The Lost Alzheimer's and Related Disorders Search Subject: New Reserach & Perspectives." Virginia Department of Emergency Management—Appalachian Search & Rescue Conference. dbS Productions, Charlottlesville, VA, 1999, http://www.dbs-sar.com/SAR_Research/lost_alzheimer.htm.

Lingard, Jayne. "Physiotherapy Support for Dementia." Contributed article written for Frontline, The Chartered Society of Physiotherapy magazine. The Mental Health Foundation, Feb. 2003, http://www.mentalhealth.org.uk/page.cfm?pagecode=PRAR2307.

Nigel King and Maurice Harker. The Foundation for People With Learning Disabilities. "Living Alone or With Others—Housing and Support for People with Learning Disabilities." The Mental Health Foundation, London, United Kingdom, 2000.

Miskelly, Frank. "A Novel System of Electronic Tagging in Patients With Dementia and Wandering." Age and Ageing, vol. 33, No. 3, pp. 304-306, British Geriatrics Society, 2004.

* cited by examiner

MONITORING MOVEMENT OF AN ENTITY IN AN ENVIRONMENT

BACKGROUND

1. Technical Field

The present invention relates to a system for and a method of monitoring movement of an entity in an environment, particularly, but not exclusively, a person suffering dementia in their home.

2. Related Art

A concerning characteristic of people suffering from dementia is that they can wander. A sufferer, herein referred to as a "client", can get lost, leave a safe environment and/or intrude into inappropriate places. To prevent the client from wandering, a caretaker can look after the client. However, such personal care may not be available and is usually an onerous responsibility for the caretaker.

A solution to this problem is for the client to wear an electronic tag and to install one or more sensors in their home to detect the tag. This process is colloquially known as "tagging". Outputs from the sensors are fed into a controller to monitor movement of the client. If controller detects that the client has left their home, then it raises an alarm, for instance by alerting a caretaker.

Tagging, however, has several drawbacks. For example, the client may perceive tagging to be intrusive and may resist wearing a tag. Even if the client agrees to wear the tag, then they may forget to wear it.

Therefore, systems have been proposed which monitor movement of the client and which do not necessitate wearing of a tag.

GB-A-2348725 describes a system including an arrangement of sensors for detecting movement, such a passive infrared detectors, a decision processor, a clock and at least one for output. The decision processor is programmed to detect a sequence of sensor activations and, if it determines that the client is leaving their home, to alert the client, for example by playing a recorded message.

US-A-20040030531 describes a more sophisticated system for monitoring and recognising behaviour of a client.

BRIEF SUMMARY

However, a drawback of a tag-less system is that it can be difficult to differentiate between movement of a client and that of a visitor. If the client has a visitor and leaves their home with them, then the system may incorrectly conclude that the client has left their home unaccompanied and raise a false alarm.

The present invention seeks to help ameliorate this problem.

According to a first aspect of the present invention there is provided a method of monitoring movement of an entity in a environment having at least one point of access, the method comprising identifying an event indicating opening of a point of access, determining whether the environment was occupied by more than one entity prior to the event and sending a notification to a terminal dependent upon whether the environment was occupied by more than one entity prior to the event.

Thus, notifications can be filtered according to occupancy of the environment and, in the case where the entity is a person suffering dementia, reduce the number false alarms.

Determining whether the environment was occupied by more than one entity prior to the event may include determining whether the environment was occupied by more than one entity during at least a predetermined period immediately preceding the event. Determining whether the environment was occupied by more than one entity prior to the event may include calculating a probability that the environment is occupied by more than one entity and comparing the probability with a predetermined threshold probability.

The method may comprise determining whether there is inactivity in the environment following the access point opening and sending the notification to the communications terminal may be dependent upon whether there is inactivity in the environment following the access point opening.

Determining whether the environment was occupied by more than one entity prior to the event may include providing a frequency of a first type of event occurring in the environment prior to the event, providing a first set of parameters for describing a frequency distribution of the first type of event occurring in the environment associated with movement of only one entity in the environment, providing a second set of parameters for describing a frequency distribution of the first type of event occurring in the environment associated with movement of more than one entity in the environment, calculating a probability, P(E|SO), of the first type of event occurring with said frequency given only one entity in the environment, calculating a probability, P(E|MO), of the first type of event occurring with said frequency given more than one entity in the environment, providing a probability, P(MO), of there being more than entity in the environment and calculating a probability, P(MO|E), of there being more than one entity in the environment given the first type of event occurring using $$P(MO \mid E) = \frac{P(MO)P(E \mid MO)}{P(E \mid SO) + P(E \mid MO)}.$$

The first type of event may be detection of movement simultaneously in two different areas of the environment.

Determining whether the environment was occupied by more than one entity prior to the event may include providing a frequency of a second type of event occurring in the environment prior to the event, providing a first set of parameters for describing a frequency distribution of the second type of event occurring in the environment associated with movement of only one entity in the environment, providing a second set of parameters for describing a frequency distribution of the second type of event occurring in the environment associated with movement of more than one entity in the environment, calculating a probability, P(E|SO), of the second type of event occurring with said frequency given only one entity in the environment, calculating a probability, P'(E|MO), of the second type of event occurring with said frequency given mote than one entity in the environment, using the probability, P(MO|E), of there being more than one entity in the environment given the first type of event occurring as a new probability, P'(MO), of there being more than entity in the environment and calculating a new probability, P'(MO|E), of there being more than one entity in the environment given the first and second types of event occurring using $$P'(MO \mid E) = \frac{P'(MO)P'(E \mid MO)}{P'(E \mid SO) + P'(E \mid MO)}.$$

The second type of event may be detection of movement from one area to another, non-adjoining area in the environment, detection of movement in the environment or detection of movement from one area to another.

The method may further comprise receiving data from a plurality of means for detecting motion, each motion detecting means positioned to detect movement in a respective area of the environment. The method may further comprise receiving data from at least one means for detecting state of the point of access.

The entity may be a person and the environment may be a dwelling.

Identifying the event indicating opening of the point of access may comprise identifying the event in real time or identifying the event in a stored set of data.

Sending the notification to the terminal may comprise sending a notification to a communications terminal.

According to a second aspect of the invention there is provided a computer program which, when executed by data processing apparatus, causes said data processing apparatus to perform the method.

According to a third aspect of the invention there is provided a computer-readable medium storing thereon a computer program.

According to a fourth aspect of the invention there is provided a system for monitoring movement of an entity in an environment having at least one point of access, the system comprising means for identifying an event indicating opening of a point of access, means for determining whether the environment was occupied by more than one entity prior to the event and means for sending a notification to a communications terminal dependent upon whether the environment was occupied by more than one entity prior to the event.

The system may further comprise means for calculating a probability that the environment is occupied by more than one entity and means for comparing the probability with a predetermined threshold probability. The system may comprise a plurality of means for detecting motion in respective areas of the environment, at least one means for detecting state of the point of access and a communication node for communicating data received from the motion detecting means and access point state detecting means to a network.

The system may comprise a first server and a second server, wherein the first server is configured to receive data from the communication node, to identify in said data the event indicating the opening of the access point and to send a request to the second server to determine a probability that the environment is occupied by more than one entity.

The system may comprise a first server and a data server, wherein the first server is configured to receive data from the communication node and to forward the data to the data server for storage.

According to a fifth aspect of the invention there is provided a system for monitoring movement of an entity in an environment having at least one point of access, the system comprising a server which includes an interface for receiving notification of an event indicating opening of a point of access and a processor configured to determine whether the environment was occupied by more than one entity prior to the event and to send a notification to a communications terminal dependent upon whether the environment was occupied by a more than one entity prior to the event.

BRIEF DESCRIPTION OF THE DRAWINGS

The processor may be further configured to provide a probability that the environment is occupied by more than one entity and to compare the probability with a predetermined threshold probability.

The processor may be further configured to calculate the probability that the environment is occupied by more than one entity. The system may further comprise another server, the other server including a processor configured to calculate the probability that the environment is occupied by more than one entity.

Figure 1:
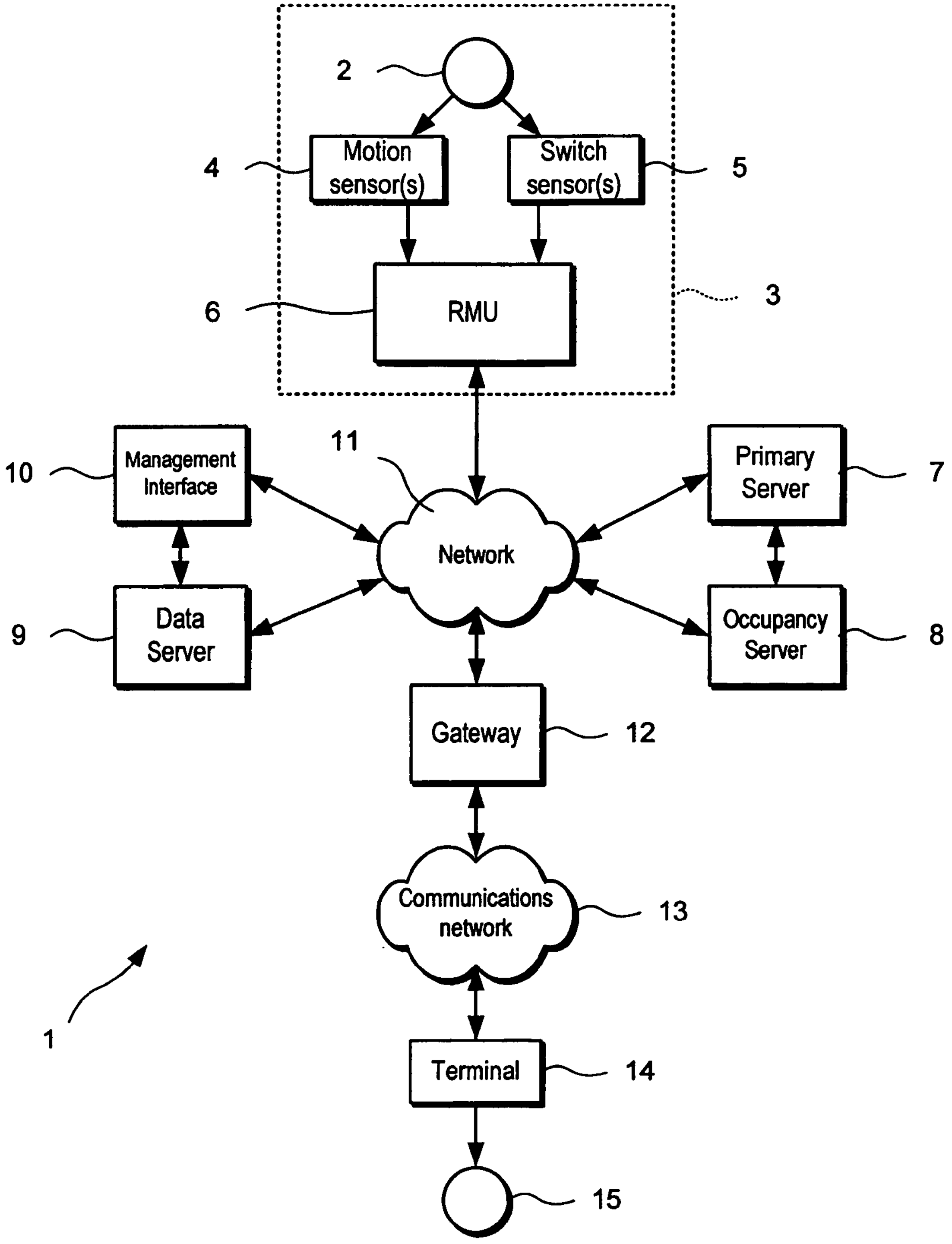
Figure 2:
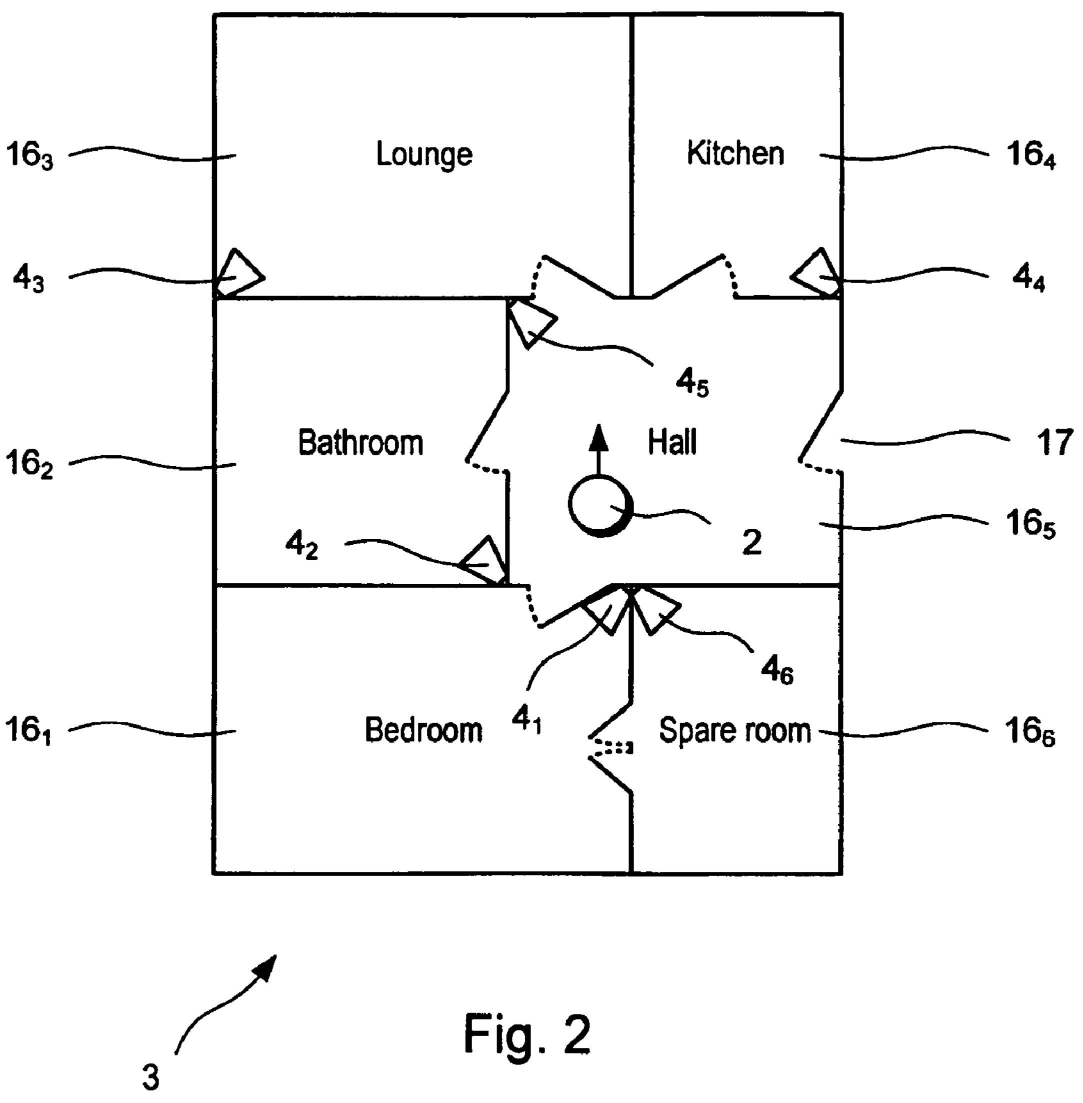
Figure 3:
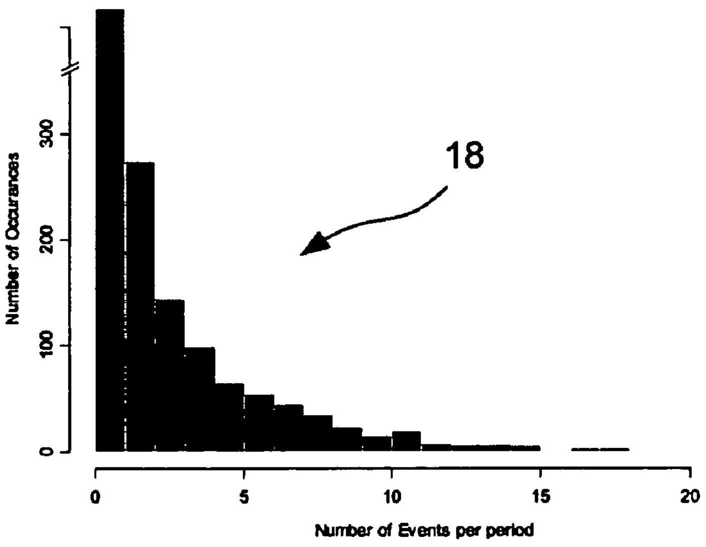
Figure 4A:
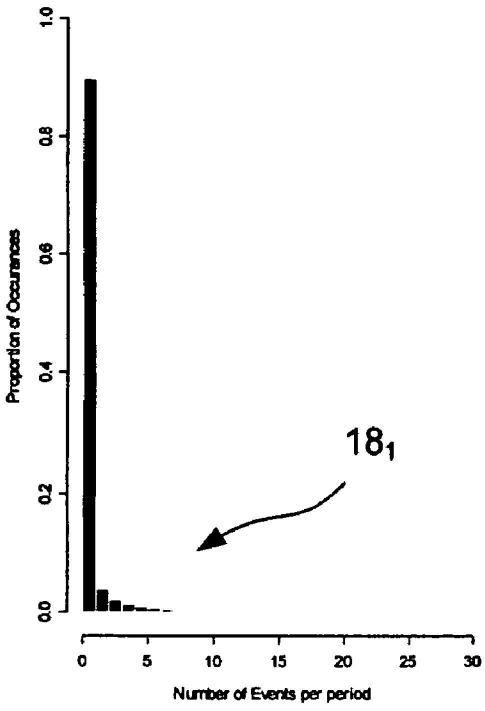
Figure 4B:
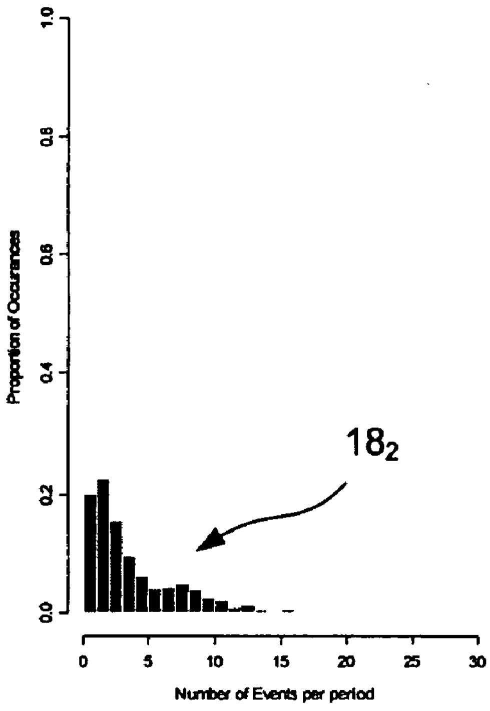
Figure 5A:
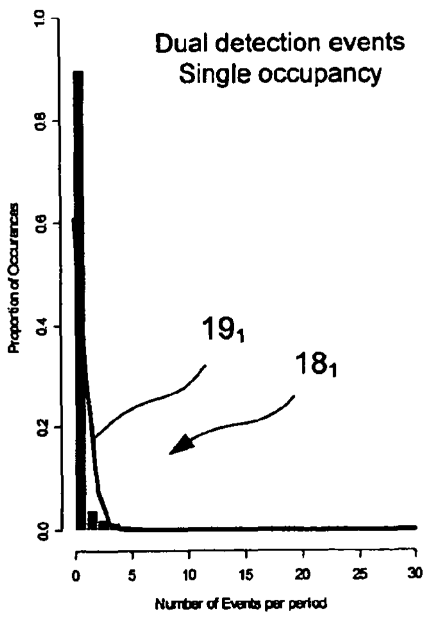
Figure 5B:
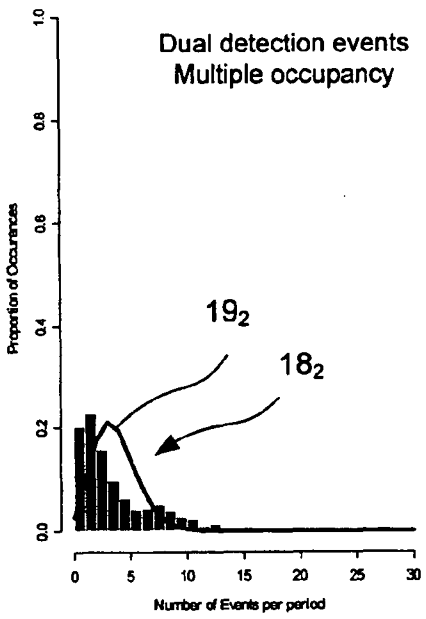
Figure 6A:
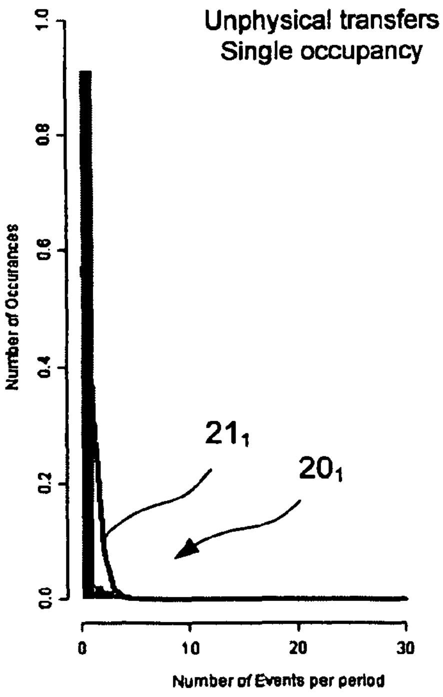
Figure 6B:
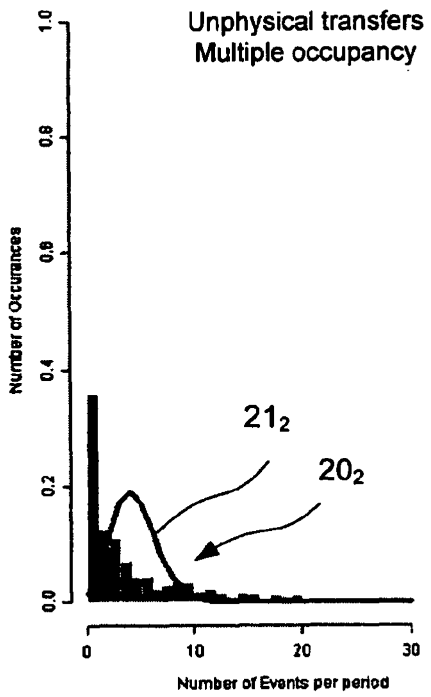
Figure 7A:
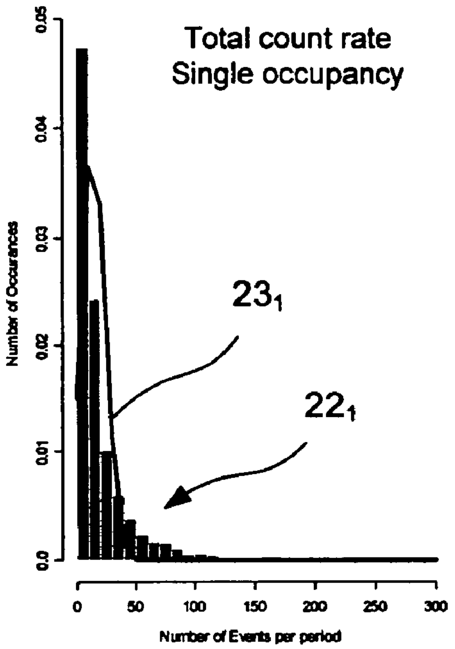
Figure 7B:
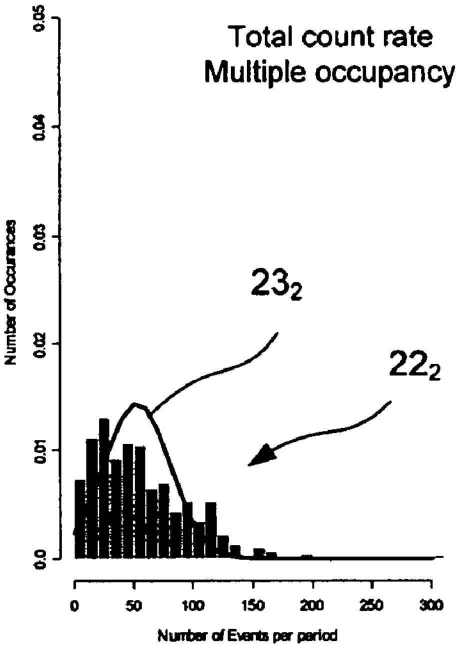
Figure 8A:
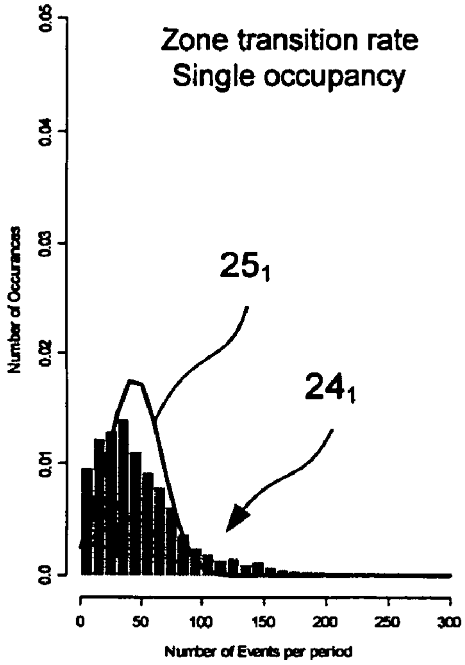
Figure 8B:
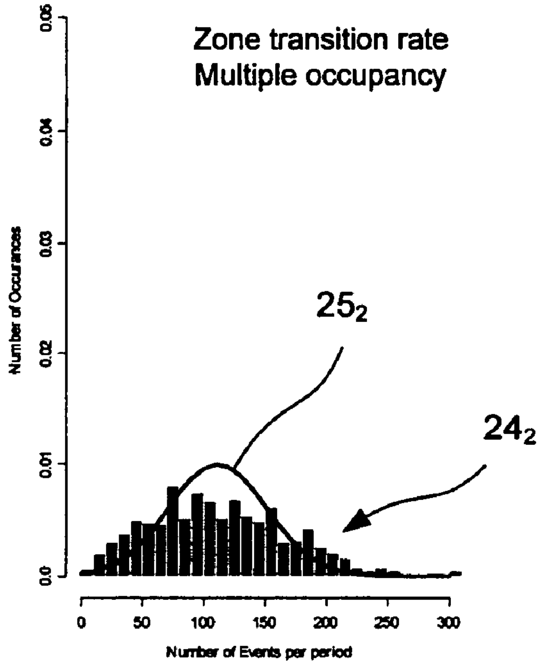
Figure 9:
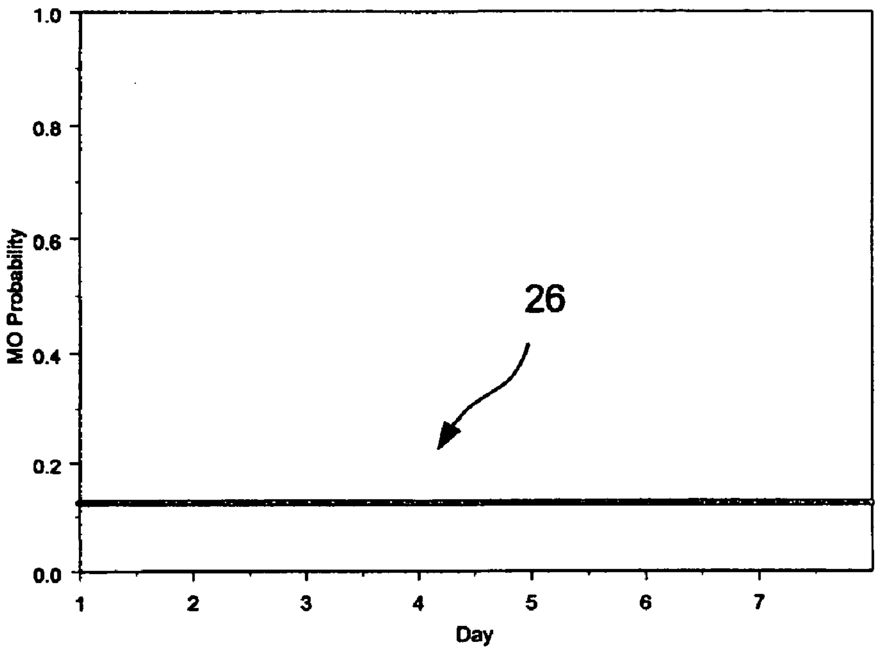
Figure 10:
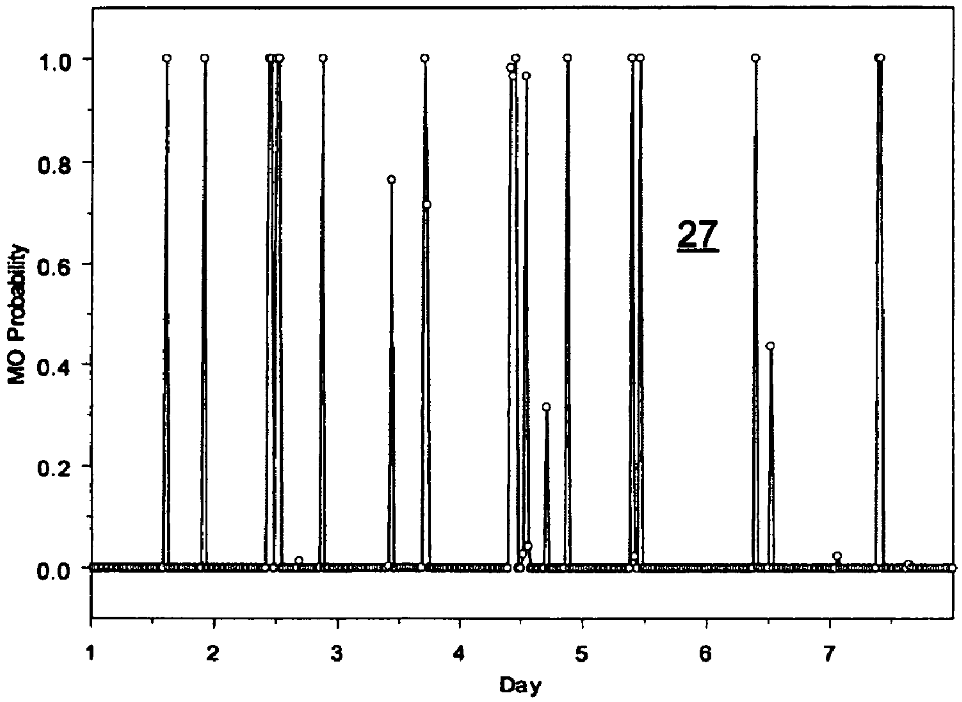
Figure 11:
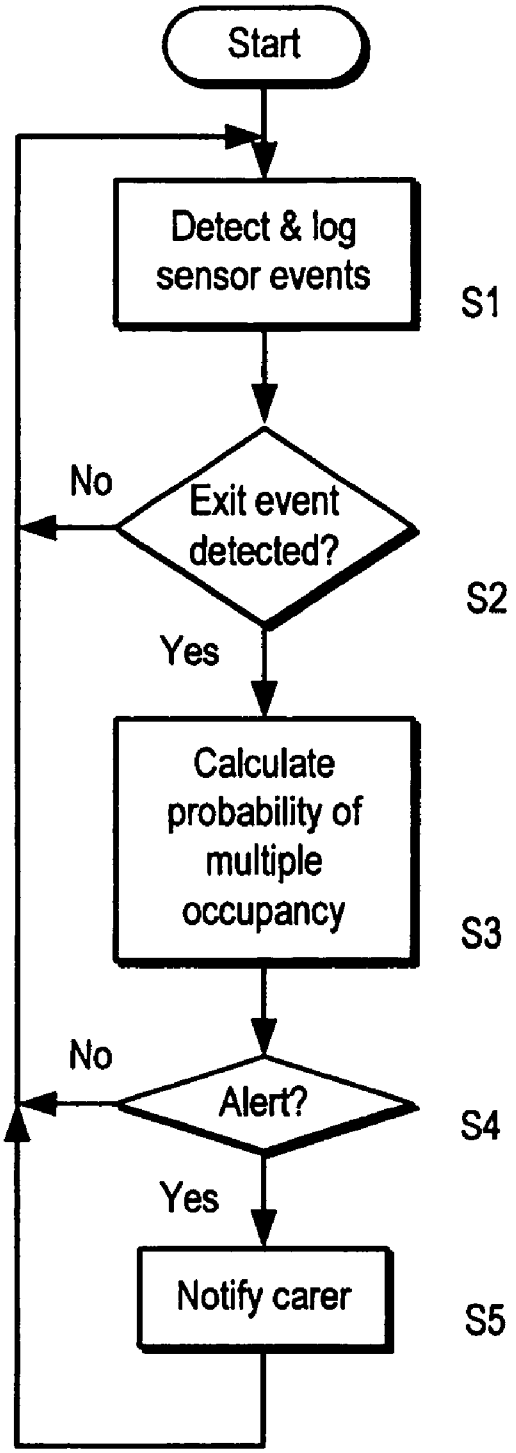
Figure 12:
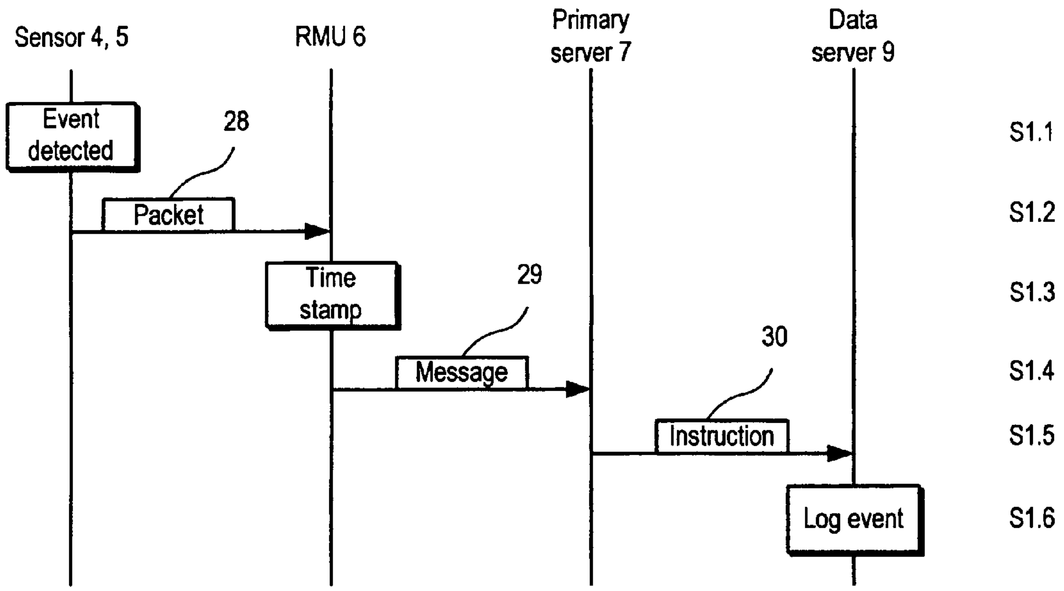
Figure 13:
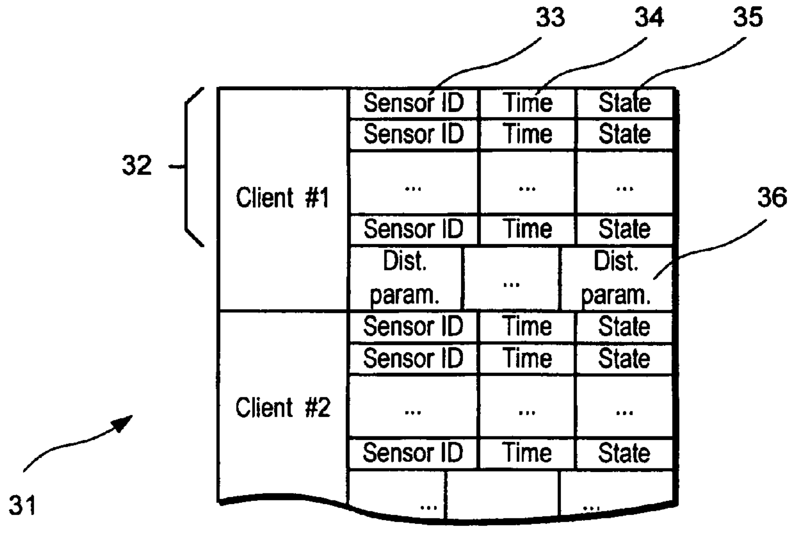
Figure 14:
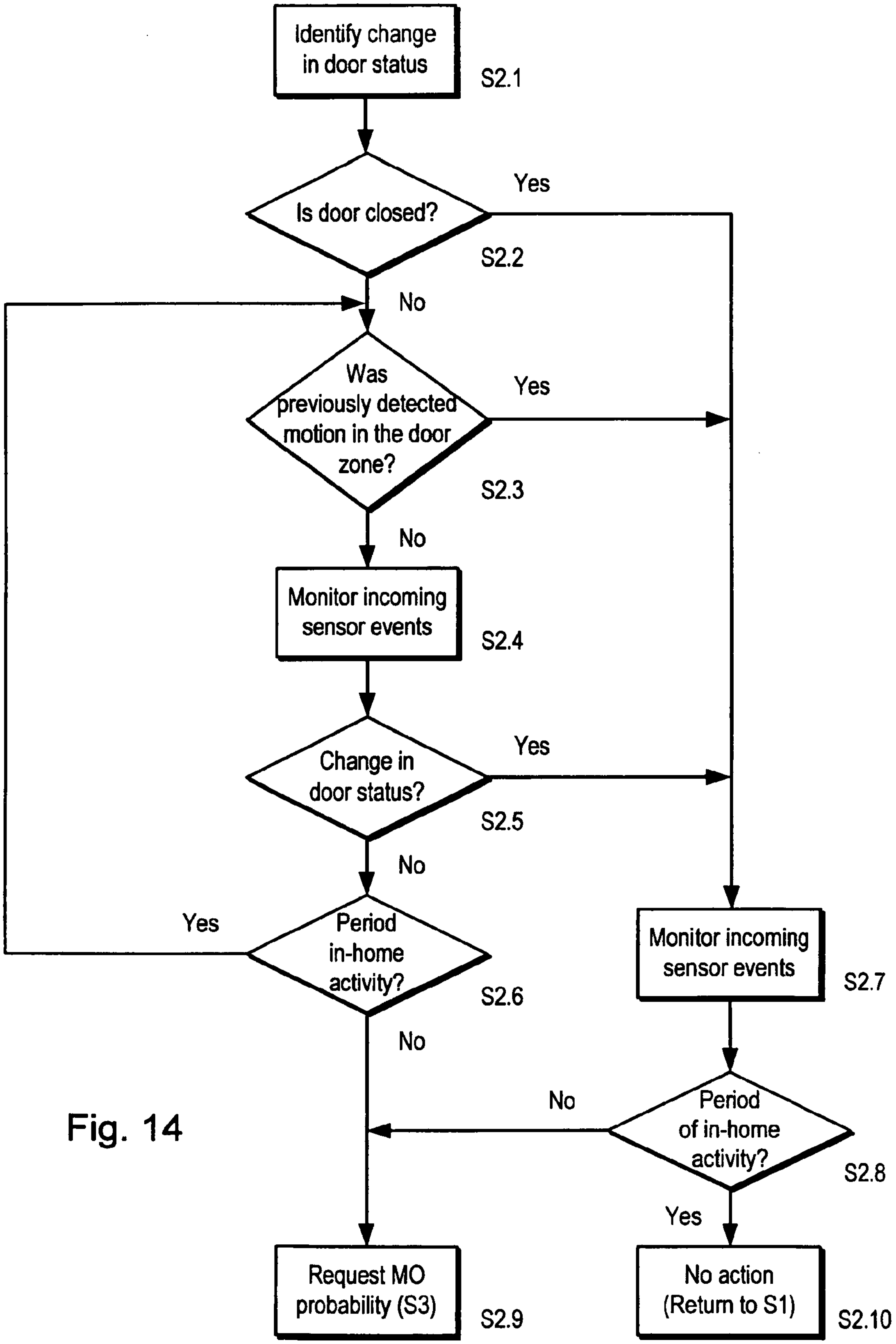
Figure 15:
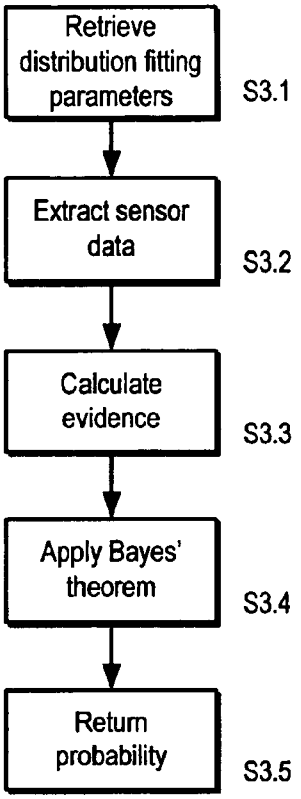
Figure 16:
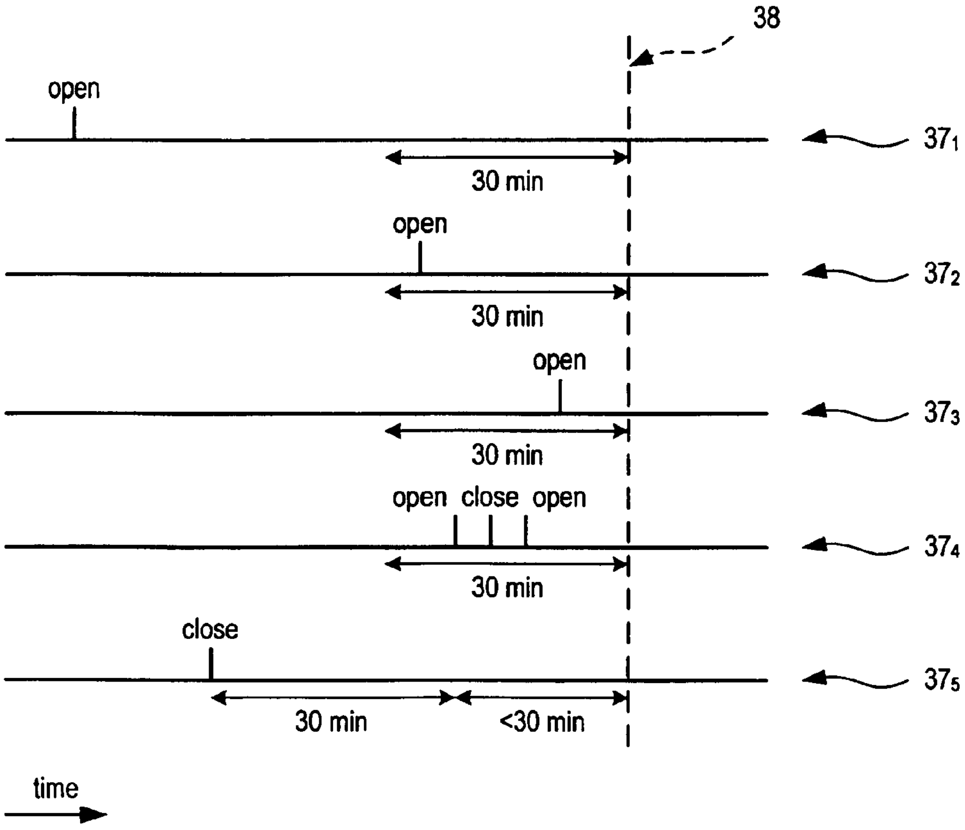
Figure 17:
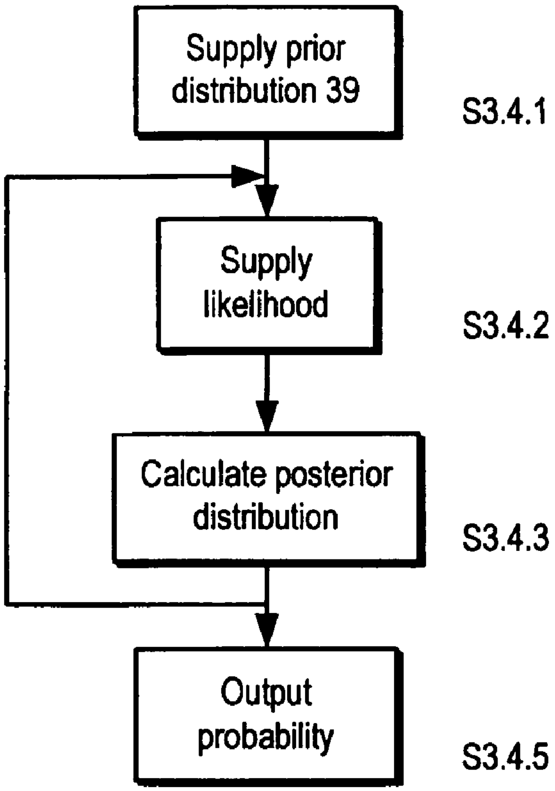
Figure 18:
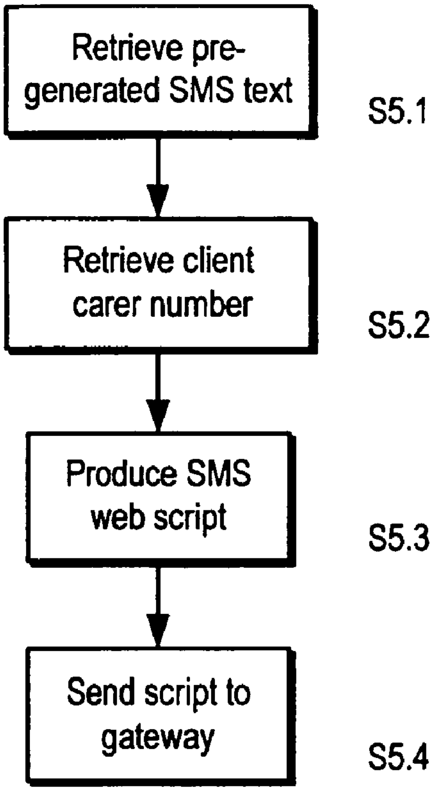

Embodiments of the present invention will now be described with reference to the accompanying drawings in which:

FIG. 1 is a schematic diagram of a system for monitoring movement of a client in a flat in accordance with an exemplary embodiment of the present invention;

FIG. 2 illustrates a floor plan of a flat;

FIG. 3 is a plot of an example of a distribution of dual detection events occurring in 30-minute periods;

FIGS. 4*a* and 4*b* are plots of examples of distributions of dual detection events occurring in 30-minute periods attributed to single- and multiple-occupancy;

FIGS. 5*a* and 5*b* show the plots shown in FIGS. 4*a* and 4*b*, together with fitted Poisson distributions;

FIGS. 6*a* and 6*b* are plots of examples of distributions of unphysical events occurring in 30-minute periods attributed to single- and multiple-occupancy, together with fitted Poisson distributions;

FIGS. 7*a* and 7*b* are plots of examples of distributions of total count rate occurring in 30-minute periods attributed to single- and multiple-occupancy, together with fitted normal distributions;

FIGS. 8*a* and 8*b* are plots of examples of distributions of zone transition rates occurring in 30-minute periods attributed to single- and multiple-occupancy, together with fitted normal distributions;

FIG. 9 illustrates an example of a prior distribution;

FIG. 10 illustrates an example of calculated posterior distribution;

FIG. 11 is a process flow diagram of a process of monitoring movement of a client and alerting a caretaker in the event that the client leaves their home in accordance with the present invention;

FIG. 12 illustrates transmission of sensor data from sensors to a remote monitoring unit, to a primary server to a data server;

FIG. 13 is a schematic diagram of a database stored in a data server;

FIG. 14 is a process flow diagram of a method of identifying an exit event;

FIG. 15 is a process flow diagram of a method of determining a probability of multiple occupancy;

FIG. 16 illustrates a plurality of exit event scenarios;

FIG. 17 is a process flow diagram of a method of applying Bayes' theorem; and FIG. 18 is a process flow diagram of a method of alerting a caretaker.

DETAILED DESCRIPTION OF EXEMPLARY EMBODIMENTS

System 1

Referring to FIG. 1, a system 1 for monitoring movement of person 2 in an environment 3 is shown. In this example, the person 2 suffers from dementia and is hereinafter referred to as a "client" and the environment 3 is their dwelling or home, in this case a flat. It is assumed that the client 2 lives by themselves.

The system 1 includes at least one motion detector 4 and, optionally, one or more switch sensors 5. The motion detectors 4 are provided by a plurality of passive infrared sensors. However, other forms of motion detector may be used. The switch sensor 5 is provided by a magnetic sensor. The magnetic sensor 5 and a permanent magnet (not shown) are mounted to a doorframe (not shown) and door 17 (FIG. 2) respectively for detecting whether the door 17 (FIG. 2) is open or closed. Other forms of switch sensors and other ways of mounting a switch sensor may be used.

The sensors 4, 5 are operatively connected to a residential monitoring unit 6 by means of a wireless network (not shown). For example, the sensors 4, 5 and the residential monitoring unit 6 may each have a transceiver (not shown) for establishing a ZigBee™ wireless network (not shown). Other types of wireless network, such as Bluetooth™ or IrDa™, can be used. The sensors 4, 5 may be operatively connected to the residential monitoring unit 6 by means of a wired network. A mixture of different types of sensors and different types of connectivities may be used.

The residential monitoring unit 6 is in the form of a home gateway or other data processing device having a processor (not shown), network interfaces (not shown) and optional storage (not shown) for processing, sending and receiving, and optionally storing data. The network interfaces (not shown) may include a wireless network card (not shown) carrying the wireless transceiver (not shown) and a modem (not shown), such as an asymmetric digital subscriber line (ADSL) modem, for communicating with a primary server 7, an occupancy-determining server 8, a data server 9 and a management server 10 via a network 11, such as the Internet.

The primary server 7 is arranged to receive sensor data from the residential monitoring unit 6 and to identify whether the client 2 is exiting or has exited the flat 3. The primary server 7 is also arranged to forward sensor data to the data server 9, to send a request the occupancy-determining server 8 to determine a probability that the flat 3 is multiply (and/or singly) occupied, to request data from the data server 9 and to instruct a gateway 12 to send a message, via a communications network 13, to a terminal 14 of a caretaker 15. For example, the gateway 12 may be a short message service (SMS) gateway, the communications network 13 may be a public land mobile network (PLMN) and the terminal 14 may be a mobile communications handset, such as a mobile telephone handset.

The occupancy-determining server 8 is arranged to request sensor data from the data server 9, to determine a probability that the flat 3 is multiply (and/or singly) occupied and to return the probability to the primary server 7. This will be described in more detail later.

The data server 9 is configured to receive and store sensor data, for example in a MySQL™ database (not shown). Data is received and retrieved in real time.

The management server 10 may be used to manage and maintain the rest of the system 1. For example, the server 10 may be used to updating software running on the residential monitoring unit 6, to investigate the status of the residential monitoring unit 6 and/or to re-boot the residential monitoring unit 6.

The primary server 7, the occupancy-determining server 8 and the data server 9 may be incorporated into a single server (not shown). Alternatively, some if not all of the functions of these servers 7, 8, 9 may be incorporated into the residential monitoring unit 6.

For clarity, only one environment 3, one set of sensors 4, 5 and one residential monitoring unit 6 are shown in FIG. 1 and described herein. However, it will be understood that there may be a plurality of such environments 3, each having a respective set of sensors 4, 5 and a respective residential monitoring unit 6. Furthermore, if several flats are located at the same site, then the flats can share one or more residential monitoring unit 6.

Referring to FIG. 2, a plan view of the flat 3 occupied by the client 2, is shown. The flat 3 includes a bedroom $\mathbf{16}_1$, bathroom $\mathbf{16}_2$, lounge $\mathbf{16}_3$, a kitchen $\mathbf{16}_4$, a hall $\mathbf{16}_5$ and a spare room $\mathbf{16}_6$. A front door 17 provides a point of access to the flat 3 and the switch sensor 5 (FIG. 1) is fitted to the door frame (not shown) holding the door 17. Each room $\mathbf{16}_1$, $\mathbf{16}_2$, $\mathbf{16}_3$, $\mathbf{16}_4$, $\mathbf{16}_5$, $\mathbf{16}_6$ is provided with a respective motion detector $\mathbf{4}_1$, $\mathbf{4}_2$, $\mathbf{4}_3$, $\mathbf{4}_4$, $\mathbf{4}_5$, $\mathbf{4}_6$, in the form of a passive infrared detector. The motion detectors $\mathbf{4}_1$, $\mathbf{4}_2$, $\mathbf{4}_3$, $\mathbf{4}_4$, $\mathbf{4}_5$, $\mathbf{4}_6$ are arranged so that each detects motion in only one respective zone, in this case only one respective room $\mathbf{16}_1$, $\mathbf{16}_2$, $\mathbf{16}_3$, $\mathbf{16}_4$, $\mathbf{16}_5$, $\mathbf{16}_6$, and are positioned in the corner of each room $\mathbf{16}_1$, $\mathbf{16}_2$, $\mathbf{16}_3$, $\mathbf{16}_4$, $\mathbf{16}_5$, $\mathbf{16}_6$.

Each motion detector $\mathbf{4}_1$, $\mathbf{4}_2$, $\mathbf{4}_3$, $\mathbf{4}_4$, $\mathbf{4}_5$, $\mathbf{4}_6$ is configured to reset after a pre-determined period of time, such as 1 second, after being triggered. The motion detector $\mathbf{4}_1$, $\mathbf{4}_2$, $\mathbf{4}_3$, $\mathbf{4}_4$, $\mathbf{4}_5$, $\mathbf{4}_6$ are allotted an identifier, for example as shown in Table 1 below:

TABLE 1

| Zone | Identifier |
|---|---|
| Bathroom | 71 |
| Bedroom | 72 |
| Living room | 73 |
| Kitchen | 74 |
| Hall | 75 |
| Spare room | 76 |

When a motion detector $\mathbf{4}_1$, $\mathbf{4}_2$, $\mathbf{4}_3$, $\mathbf{4}_4$, $\mathbf{4}_5$, $\mathbf{4}_6$ is triggered, it may report the identifier to the residential monitoring unit 6 (FIG. 1). Alternatively, the residential monitoring unit 6 (FIG. 1) may deduce the identity of the motion detector $\mathbf{4}_1$, $\mathbf{4}_2$, $\mathbf{4}_3$, $\mathbf{4}_4$, $\mathbf{4}_5$, $\mathbf{4}_6$, for example by virtue of receiving the trigger signal on a given channel or wire, and assign an identifier accordingly. Different identifiers may be used.

It will be appreciated that the environment 3 need not be a flat, but can be a single- or multiple-story house, having fewer or additional rooms, having fewer or additional doors to the outside of the dwelling and having a different configuration. Switch sensors 5 (FIG. 1) may also be mounted to window frame (not shown) for detecting opening of windows (not shown).

Referring again to FIG. 1, the system 1 is arranged to monitor movement of the client 2 in their flat 3 and to alert a caretaker 15 in the event that the client leaves the flat 2 unaccompanied. To help avoid false alarms, the system 1 is arranged to determine whether the flat 3 is multiply occupied and to filter events which would otherwise trigger an alarm.

If an event is detected which might indicate that the client 2 has left the flat 2 (herein referred to as an "exit event"), the occupancy-determining server 8 (FIG. 1) carries out a process of determining a probability of multiple occupancy based on sensor data immediately preceding the exit event. However, before describing this process, a statistical approach and probability distributions employed by the process, as well as indicators of multiple occupancy used by the process, will first be described.

Statistical Approach

A Bayesian approach to determining a probability of multiple occupancy is used. This approach has advantages. For example, the approach can calculate subjective probabilities for unobservable events and can combine data, data which may come from different sources and/or may have been differently pre-processed, in a straightforward manner.

A probability P(MO|E) of multiple occupancy MO given evidence E (also referred to as the "posterior distribution") can be defined using Bayes' Theorem as:

$$P(MO \mid E) = \frac{P(MO)P(E \mid MO)}{P(E)} \tag{1}$$

where P(MO) is the probability of multiple occupancy before inclusion of the evidence (also referred to as the "prior distribution"), P(E|MO) is the probability of the evidence given multiple occupancy (also referred to as the "likelihood function") and P(E) is the probability of the evidence, with or without multiple occupancy.

As will be explained in more detail later, equation 1 above is used to calculate a probability of multiple occupancy given multiple occupancy and single occupancy evidence available from the motion detector data.

Probability Distributions

Probability distributions are used to describe occurrences of events.

A first probability distribution which is used is the Poisson distribution. If a particular event, i, occurs with a probability of success, p, then the probability of getting x successes, from N trials, assuming the events happen independently, is given by the Binomial distribution:

$$P(x \mid N) = \frac{N!}{x!(N-x)!} p^x (1-p)^{N-x} \tag{2}$$

If the number of trials is large such that $N \rightarrow \infty$ then, under this limit, the Binomial distribution becomes the Poisson distribution, namely:

$$P(x, \lambda) = \frac{\lambda^x}{x!} \exp(-\lambda) \tag{3}$$

Where x is the number of successes or events and λ is the expected number of successes $\lambda = pN$. The Poisson distribution can therefore be used to estimate the probability of obtaining a particular number of events, x, in a unit time period. In this context the parameters λ is the expected number of events per unit time period.

A Poisson process can also be shown to produce inter-event times which are exponentially distributed. For example, the probability of no events occurring in a time T, is equivalent to the probability of having to wait at least a time T for an event to occur. Equation 3 above may be expressed as:

$$P(T>t) = e^{-\lambda t} \tag{4}$$

A second probability distribution which is used is the Normal distribution. If the number of events, x, is large then it can be seen, from Equation 3, that care needs to be taken to avoid the numerical difficulties that may arise due to the inclusion of the factorial term in the expression. The normal distribution is free from these complications and, for this reason, a normal approximation can be used to describe a Poisson process.

The Normal distribution for a sample, with variance $\sigma^2$ and mean μ, may be written as:

$$p(x \mid \sigma, \mu) = \frac{1}{\sigma\sqrt{2\pi}} \exp\left(-\frac{(x-\mu)^2}{2\sigma^2}\right) \tag{5}$$

The normal distribution can be used when numerical difficulties may have arisen if the Poisson distribution was used.

Indicators of Multiple Occupancy

As will be described in more detail later, the occupancy-determining server 8 (FIG. 1) carries out the process of determining a probability of multiple occupancy using at least one indicator of multiple occupancy. The indicators are based on the assumption that, if there are multiple occupants in the flat 3 (FIG. 1), then a higher level of activity, i.e. the frequency with which an event occurs, will be detected compared with the activity if there is only a single occupant. Indicators are also referred to herein as "available evidence".

Indictors which can be used include (i) dual detection events, (ii) unphysical transfers, (iii) total count rate, (iv) zone transition rates and (v) inactive period duration.

A dual detection event occurs when simultaneous movement is detected in two different zones, for example two different rooms 16$_1$, 16$_2$, 16$_3$, 16$_4$, 16$_5$, 16$_6$ (FIG. 2). A dual detection event may occur if zones overlap. However, this can be avoided by carefully placing motion detectors 4$_1$, 4$_2$, 4$_3$, 4$_4$, 4$_5$, 4$_6$ (FIG. 2).

An unphysical transfer occurs when movement is detected between zones which cannot be achieved by a single occupant, for example when movement starts and finishes in different zones which are not adjoining. This type of event may be classified according to the lowest number of intermediate rooms that a single occupant would need to pass through to make the transition between the start and end zones.

The total count rate in a specific time period provides a measure of the amount of continuous movement taking place in the dwelling.

The zone transition rate is defined as the total number of zone changes recorded in a specific time period. There are two possible reasons for believing that the rate would increase during multiple occupancy periods. Firstly, if different occupants are active in separate rooms, then hopping between the two rooms can be expected. This would increase the zone transition rate. Secondly, during multiple occupancy periods, different types of activities may take place within the flat 3. These activities may require greater mobility between different zones. Therefore, this would also increase the zone transition rate.

The duration of inactive periods examines inter-event times regardless of the average rate of events over a specified time period. This can be a useful indicator of occupancy because a visitor generally visits a single occupancy dwelling with a specific reason in mind and so is unlikely to result in both the client and the visitor being stationary for an extended period of time. For example, there are several activities which a single occupant may perform which would mean that they would be stationary, such as watching television, reading and sleeping. However, a visitor is less likely to perform these activities.

As will be explained in more detail later, the frequency of occurrence of the indicators is modelled by statistical distributions and distribution parameters are calculated against which activity is compared. A lower limit of 5 minutes of inactivity can be set to reduce the influence of normal, continuous movement when such distribution parameters are calculated. The calculated probability is, therefore, the probability of a period of inactivity of t minutes occurring, given that the 5-minute limit had been exceeded.

Although five possible indicators have been described, other different indicators can be used.

As will be explained in more detail later, the occupancy-determining server 8 (FIG. 1) carries out a process of determining a probability of multiple occupancy using at least one indicator of multiple occupancy by combining occupancy level indicators using Bayes' theorem. This involves choosing a prior distribution and using a first piece of evidence, such as dual detection events, to calculate a likelihood function and, subsequently, a posterior distribution. The process can be repeated by updating the posterior distribution by including additional evidence, until a final posterior distribution is reached. The final distribution gives the probability of multiple occupancy, given the evidence, and thus can be used by the primary server 7 (FIG. 1) to determine whether to alert the caretaker 15 (FIG. 1).

Distribution Parameters

Historical sensor data can be divided into two sets, one representative of multiply-occupied periods and the other representative of singly-occupied periods.

For a single-residency dwelling, such as flat 3, a set of sensor data gathered over any period of time may be assumed to be dominated by singly-occupied time periods. If this assumption is made, then the singly-occupied data set can be approximated by the use of the entire data set. The assumption is equivalent to stating that the client 2 (FIG. 1) spends a majority of the time on their own and only has a visitor for short periods of the day.

A drawback of adopting this approach is that the activity level of the client 2 (FIG. 1) will be underestimated since night time sleeping periods are included. One way to address this problem is to use temporal boundaries to define a daytime activity period, for example between 10 am and 10 pm, and to use only daytime data.

A distribution parameter defining a multiple-occupancy set can be created using dual detection events and unphysical transfers. A multiple-occupancy set can be created using only unphysical transfers or another indicator. However, using more than one indicator usually has the advantage that a larger set of data is available.

The multiple-occupancy set need not be defined by a data set obtained exclusively during periods of multiple occupancy, but by a data set obtained during periods when multiple occupancy is common. For example, if the client regularly, but not necessarily always, receives visitors at a given time, for example between 10 and 11 am every day, then a data set obtained during this period over several days can be used to define a multiple-occupancy set.

Additionally or alternatively, door status can be examined and periods between a door closing and a door opening with duration of greater than 30 minutes and less than 2 hours can be selected as a possible multiple occupancy period. The number of dual detection events and unphysical transfers occurring during each time period is counted.

As dual detection events may occur due to common coverage of sensors, a threshold event rate is set above which multiple occupancy is likely to exist.

A suitable threshold can be found by examining the overlap of the data sets for dual detection events and unphysical transfers. For example, a threshold can be found by maximising the overlap, while keeping the threshold rate for dual detection events as high as possible so as to ensure that multiple occupancy exists in as many instances as possible. A multiple occupancy set is then defined using both dual detection events and unphysical transfers.

Although a high threshold rate for dual detection events for indicating multiple occupancy is desirable for identifying occurrences of multiple occupancy with greater certainty, it should be noted that if the flat is multiply occupied and the activity of the occupants produces an unusually low dual detection event rate, then this may lead to a conclusion that the flat is singly occupied.

The two data sets are used to calculate a mean and a variance for at least one of the indicators listed earlier. These parameters are used to facilitate fitting of a Poisson or normal distribution for each indicator.

Data Sets for Dual Detection Events

Referring to FIG. 3, a plot 18 of an example of a distribution of dual detection events occurring in 30-minute divisions is shown. The vertical scale (i.e. number of occurrences) is broken due to the high number of occurrences of no dual detection events. For the distribution shown in FIG. 3, there are over 7000 periods with no or just one dual detection event.

Referring to FIGS. 4*a* and 4*b*, the distribution shown in FIG. 3 may be resolved into plots $\mathbf{18}_1$, $\mathbf{18}_2$ of distributions of dual detection events occurring in 30-minute divisions for multiple- and single-occupancy respectively.

For a Poisson distribution, the parameter used to provide a fit is the mean. The mean is 0.50 events per 30-minute division for the single occupancy data set shown in FIG. 4*a* and 3.65 events per 30-minute division for the double occupancy data set shown in FIG. 4*b*.

Referring to FIGS. 5*a* and 5*b*, the plots $\mathbf{18}_1$, $\mathbf{18}_2$ of the distributions of dual detection events for single and multiple occupancy data sets, together with plots $\mathbf{19}_2$, $\mathbf{19}_2$ of corresponding fitted Poisson distributions are shown.

Data Sets for Unphysical Transfer

A physical relationship between zones is used to classify a given room transition as being an unphysical transfer.

A first process of classifying transitions as being unphysical may include examining the floor plans for the dwelling, such as that shown in FIG. 2, and identifying non-adjoining room. The process may also include considering positioning of motion sensors $\mathbf{4}_1$, $\mathbf{4}_2$, $\mathbf{4}_3$, $\mathbf{4}_4$, $\mathbf{4}_5$, $\mathbf{4}_6$ and considering likely routes since detection of movement in a particular intervening room may be unlikely. Unphysical transfers may be recorded in a look-up table for a given dwelling.

It is noted that an unphysical transfer need not be indicative of multiple occupancy. This is because movement of a single occupant could create such an event. This may arise because a motion sensor in an interconnecting room may fail to detect movement or because the detected movement may fail to be recorded in the data.

To minimise the occurrence of such spurious events, a time threshold can be set to ensure that not only are two rooms non-adjoining, but also that the time between the sensor events is significantly shorter than the time normally taken for the room transition (where the intermediate room event was recorded). A time threshold may be set as the quickest 10% of the start-middle-end room transition times. Unphysical transfers requiring two sensor events to be missed can be included without any such thresholds.

A second process of classifying transitions as being unphysical does not involve examining floor plans of a dwelling. Instead, inter-room relationships are inferred by assuming that the flat is singly occupied for the majority of the time and by examining sensor data to identify commonly used paths between zones. By considering each particular room pairing and by calculating the percentage of direct, one intermediate room and two intermediate rooms transitions, physically allowed and physical forbidden transitions can be found. For example, the sensor data may be examined to identify transfers between two rooms, such as the lounge 16$_3$ (FIG. 2) and the hall 16$_5$ (FIG. 2). If a sequence of sensor activations includes activation of the sensor 4$_3$ (FIG. 2) in the lounge, immediately followed by activation of the sensor 4$_5$ (FIG. 2) in the hall, then this indicates a possible direct transfer. If the sequence includes intermediate activation(s), then this indicates a possible indirect transfer. If a relatively high proportion, for example over 60%, of transfers between the two rooms are found to be direct, then the two rooms can be considered to be adjoining. Conversely, if a relatively low proportion, for example less than 30%, of transfers between the two rooms are found to be direct, then the rooms can be considered not to be adjoining. Further classification of the number of intermediate rooms can also be carried out by selecting the transfer with the highest percentage of occurrences.

As will be explained later, the occupancy-determining server 8 (FIG. 1) may determine a probability of multiple occupancy using unphysical transfers. However, there may occasions when there is insufficient sensor data available to identify room relationships. In this case, the occupancy-determining server 8 (FIG. 1) executes the process for determining probability of multiple occupancy using other indicators, such a dual detection events, without considering unphysical transfers until sufficient data becomes available to determine the room relationships.

Referring to FIGS. 6*a* and 6*b*, plots 20$_1$, 20$_2$ of examples of distributions of unphysical transfers for single and multiple occupancy data sets, together with plots 21$_1$, 21$_2$ of corresponding fitted Poisson distributions are shown.

The mean is 0.56 events per 30-minute division for the single occupancy data set shown in FIG. 6*a* and 4.41 events per 30-minute division for the double occupancy data set shown in FIG. 6*b*.

Data Sets for Total Count Rate

Total count rate gives an indication of the amount of movement in the dwelling. Whilst not a decisive measure of multiple occupancy, an increase in the amount of movement is indicative of an increase in the number of occupants. The total count rate usually has a higher number of events per time division than the previous indicators and so can be modelled using a normal distribution. This provides another fitting parameter, namely variance, and can be used to provide a better fit. The fit may be improved by removing outliers, such as top and bottom 10% from the data set used to calculate distribution parameters.

Referring to FIGS. 7*a* and 7*b*, plots 22$_1$, 22$_2$ of examples of distributions of total count rate for single and multiple occupancy data sets, together with plots 23$_1$, 23$_2$ of corresponding fitted normal distributions are shown.

The mean and variance are 44.2 and 506.3 events per 30-minute division respectively for the single occupancy and 111.2 events and 1616.0 events per 30-minute division respectively for the double occupancy.

Data Sets for Zone Transition Rate

Referring to FIGS. 8*a* and 8*b*, plots 24$_1$, 24$_2$ of examples of distributions of total count rate for single and multiple occupancy data sets, together with plots 25$_1$, 25$_2$ of corresponding fitted normal distributions (outliers not used in the fit) are shown.

The mean and variance are 14.0 and 101.9 events per 30-minute division respectively for the single occupancy and 52.6 events and 767.8 events per 30-minute division respectively for the double occupancy.

Data Sets for Lack of Activity

Periods of lack of activity in the dwelling can be modelled using the inter-event time available from the Poisson distribution shown in equation 4 above. The inter-event time calculation uses an average rate of sensor firings. Rather than using all the data, a subset of the data can be found for periods when a low movement activity was not taking place in the dwelling. A threshold of at least 5 min between sensor firings can be used to indicate a period of lack of activity in the dwelling.

For example, for an exemplary client, mean rates are 0.01 events per minute for single occupancy and 0.04 events per minute for multiple occupancy.

Prior Distribution

Equation 1 above uses a prior distribution, P(MO). The prior distribution represents an initial belief about the probability of multiple occupancy occurring in a given dwelling at a particular time.

A prior distribution can be obtained by dividing a day into different time periods and estimating the probability of multiple occupancy across the day. Alternatively, a uniform prior distribution can be selected. This has the advantage that no specific knowledge of visitation times or durations is required. A probability value of 0.125 can be used, which corresponds to 3 hours of visits a day, and a plot 26 of prior distribution for a week is shown in FIG. 9. For comparison, a plot 27 of posterior distribution for the week is shown in FIG. 10.

As will be described in more detail later, the occupancy server 8 determines a probability that the flat is multiply occupied. Thus, the occupancy server 8 outputs a value. The way in which this value can be interpreted will now be briefly described.

Interpretation

Periods during which the door is closed can be classified as being periods during which the flat 3 is either multiply occupied or singly occupied. A loss or utility function is used to classify occupancy. The function represents the "cost" of each possible outcome and includes two occupancy levels and two classifications, as specified in Table 2 below:

TABLE 2

| | Classification | |
|---|---|---|
| Occupancy Level | Single | Multiple |
| Single | $C_{ss}$ | $C_{sm}$ |
| Multiple | $C_{ms}$ | $C_{mm}$ |

Examples of values which can be used are given in Table 3 below:

TABLE 3

| | Classification | |
|---|---|---|
| Occupancy Level | Single | Multiple |
| Single | 0 | 150 |
| Multiple | 50 | 0 |

The loss function of Table 3 specifies that there is no cost of getting a classification correct. However, Table 3 specifies that there is a cost of getting a classification wrong and, in particular, that the cost of getting a classification wrong is greater if a period is erroneously classified as being multiply occupied than the cost of getting the classification wrong is greater if a period is erroneously classified as being singly occupied.

Expected costs, $EC_{single}$ and $EC_{multiple}$ for the two possible decisions are given by:

$$EC_{single} = \frac{C_{ss}P(SO) + C_{sm}P(MO)}{P(SO) + P(MO)} \quad (6)$$

$$EC_{single} = \frac{C_{ss}P(SO) + C_{sm}P(MO)}{P(SO) + P(MO)} \quad (7)$$

Decision theory is used to minimise the expected cost when a period is classified. If the values given in Table 3 are used, then the decision threshold is P(MO)=0.75. Periods with a probability below the threshold would be classified as periods of single occupancy and those above the threshold as periods of multiple occupancy.

Operation

Referring to FIGS. 1, 2 and 11, a process of monitoring movement of a client 2 and alerting a caretaker 15 in the event that the client 2 leaves their flat 3 unaccompanied will now be described. As explained earlier, this process may be executed by a distributed system 1. However, the process may be performed locally at the flat 3. For example, the remote monitoring unit 6 may execute one or more of the steps performed by primary server 7, occupancy server 8 and/or data server 9.

The process includes detecting and logging events (step S1) and identifying if the event possibly indicates that the client 2 has left their flat 3 (step S2). If such an event is identified, then a probability of multiple occupancy (or, conversely, single occupancy) is calculated based on sensor data within a given time frame preceding the event (step S3) so as to determine whether the client 2 was alone before leaving and, thus, has left unaccompanied (step S4). If the calculated probability indicates that the client 2 was likely to have been alone, then the caretaker 15 is notified (step S5).

By calculating a probability of multiple (or single occupancy), alerts can be filtered and so help to reduce the number of false alarms, for example when the client 2 leaves the flat accompanied by a caretaker 15.

Referring to FIG. 12, the process of detecting and logging events of step S1 shown in FIG. 11 is shown in greater detail.

The sensors 4, 5 continually monitor the flat 2 for events and whenever a sensor 4, 5 detects an event (step S1.1), the sensor 4, 5 sends a data packet 28 to the remote monitoring unit 6 (step S1.2). The data packet 28 includes (or may be) a single bit indicating the state of the sensor. For example, when a motion sensor 4 is triggered, it may send '1'. When a switch sensor 5 is changes state, it may send '1' to indicate that the door has been opened and may send '0' to indicate that the door has been closed. The remote monitoring unit 6 may add further information, if necessary, such as a time stamp, an identifier for identifying the sensor 4, 5 and an identifier for identifying the client 2, flat 3 or remote monitoring unit 6 (step S1.3). The remote monitoring unit 6 sends the modified packet as a message 29 to the primary server 7 (step S1.4). The primary server 7 sends an instruction 30, which may comprise simply forwarding the message 29, to the data server 9 for the data server 9 to log the event (step S1.6).

Referring to FIG. 13, events are logged in a database 31. The database 31 is organised into parts 32 corresponding to each client 2 and includes entries 33, 34, 35 identifying the sensor 4, 5, time of firing and state. The database 31 also includes distributions parameters 36.

Referring to FIGS. 1, 2 and 14, the process of identifying if the event possibly indicates that the client 2 has left their flat 3 is shown in greater detail.

The remote monitoring unit 6 notifies the primary server 7 if there is a change in the status of a door, which in this case is front door 17 (step S2.1). The primary server 7 determines whether the door is open or closed (step S2.2). If the door is now open, the primary server 7 retrieves the last set of movement sensor data from the database 31 at the data server 9 and checks whether there was motion in the zone adjacent to the door, in this case hall 165 (step S2.3). If the motion is in another zone, then the primary server 7 concludes that the user has not left the flat 3. This situation may occur if someone else enters the flat 3. Even though the user has not left the flat, the primary server 7 monitors incoming messages 29 for a given period of time (step S2.4) to check whether the front door is subsequently closed (step S2.5). If the door is still open, then the primary server 7 checks whether there is activity in the flat 3 (step S2.6). If there is still activity, then the server 7 checks whether there is motion in the hall 165 (step S2.3).

If, at step S2.2 or step S2.5, the door is closed or if, at step S2.3, the door is open and there is movement in the hall, then the primary server 7 monitors incoming messages 29 for a given period of time, for instance 2 minutes (step S2.8). The primary server 7 checks whether there is activity in the flat 2 (step S2.9). If there is no in-flat activity is identified at steps S2.6 or S2.9, then the primary server 7 sends a request to the occupancy server 8 to determine the probability of multiple occupancy (step S2.10).

If the door is closed and if there is in-flat activity at step S2.9, then the primary server 7 concludes that the user has not left the flat 2 (step S2.10). The primary server 7 can then continue to monitor messages in the usual way or stop monitoring and wait to be notified if the door opens (step S1).

Referring to FIGS. 1, 2 and 15, the process of calculating the probability of multiple occupancy is shown in greater detail.

The occupancy-determining server 8 retrieves distribution fitting parameters 36 (FIG. 13) for each one of one or more indicators, such as dual detection events, unphysical transfers, total count rate, zone transition rates and inactive period duration, from the data server 9 (step S3.1). The occupancy-determining server 8 also retrieves sensor data 33, 34, 35 (FIG. 13) for a given period of time, up to the last the message (step S3.2). Usually, the given period time is much shorter than the period of time used to calculate distribution parameters. For example, sensor data 33, 34, 35 (FIG. 13) for a period of 30 minutes preceding the exit event is used. However, the occupancy-determining server 8 may retrieve sensor data 33, 34, 35 (FIG. 13) for longer periods, as will now be explained.

Referring to FIG. 16, time lines $37_1$, $37_2$, $37_3$, $37_4$, $37_5$ are shown illustrating different scenarios in which the front door 17 (FIG. 2) is opened and/or closed prior to an event 38 which may be indicative of the client 2 leaving the flat 3 unaccompanied.

The first, second, third and fourth timelines $37_1$, $37_2$, $37_3$, $37_4$ illustrate scenarios in which the front door 17 (FIG. 2) has been (a) open for more than 30 minutes prior to the event 38, (b) open for just less than 30 minutes prior to the event 38, (c) open for much less than 30 minutes prior to the event 38 and (d) opened and closed several times within 30 minutes prior to the event 38, respectively. In these situations, the occupancy-determining server 8 (FIG. 1) retrieves sensor data 33, 34, 35 for a relatively short period, in this case 30 minutes.

The fifth timeline $37_5$ illustrates a scenario in which the front door 17 (FIG. 2) has been shut for more than 30 minutes. In this situation, the occupancy-determining server 8 can retrieve sensor data 33, 34, 35 for a longer period.

If more than 30 minutes of sensor data 33, 34, 35 is available, then the occupancy server 8 (FIG. 1) can divide the sensor data 33, 34, 35 into 30-minute blocks. The 30-minute blocks may overlap.

Referring again to FIGS. 1, 2 and 15, the occupancy-determining server 8 calculates evidence for each indicator (step S3.3).

Taking the example of dual detection events, the occupancy-determining server 8 counts the number of dual detection events in the 30-minute period preceding the away event 38 (FIG. 16) and, using distribution parameters 35 for single- and multiple-occupancy data sets, calculates likelihood functions for single-occupancy and multiple occupancy, namely P(E|SO) and P(E|MO), and also a probability of evidence P(E).

As explained earlier, the single-occupancy and multiple occupancy data sets can be modelled using Poisson distributions. Therefore, the distribution parameters 35 for the for single- and multiple-occupancy data set are the means of the respective distributions.

The occupancy-determining server 8 calculates P(E|SO) and P(E|MO) using equation 3 above, setting x to the number the counted number of dual detection events and setting $\lambda$ to the mean of the single-occupancy and multiple-occupancy data sets respectively.

The occupancy-determining server 8 calculates P(E) by taking the sum of P(E|SO) and P(E|MO).

The occupancy-determining server 8 can calculate evidence for other indicators in a similar way. For some indicators, normal distribution parameters are used instead of Poisson distribution parameters.

Once the occupancy-determining server 8 has at least one set of indicator evidence, usually dual detection events evidence, it determines a posterior probability using Bayes' Theorem (step S3.4).

Referring also to FIG. 17, the occupancy-determining server 8 retrieves an initial value 39 for the probability of multiple occupancy before the inclusion of evidence, namely P(MO) (step S3.4.1). The value 39 may be stored locally or in the data server 9. As described earlier, the initial value 39 is set to 0.125, although another different value may be used.

The occupancy-determining server 8 has values for P(E|SO), P(E|MO) and P(E) for a first indicator, in this case dual detection events (step S3.4.2). The occupancy-determining server 8 then calculates a posterior distribution P(MO|E) using equation 1 above (step S3.4.3).

Using the posterior distribution calculated at step S3.4.3 as a new prior distribution, steps S3.4.2 and S3.4.3 can be repeated for another indicator, to calculate a new posterior distribution. The process can be repeated for each indicator. In this way, different indicators can be combined to provide a higher degree of confidence.

Once all the evidence has been included, a final posterior distribution is output (step S3.4.5) and is returned to the primary server 7 for evaluation (step S3.5).

Referring again to FIGS. 1, 2 and 11, the primary server 7 receives a final posterior distribution from the occupancy-determining server 8 and compares it with a threshold probability value, which in this case is set to 0.75, to determine whether or not the flat 3 was multiply occupied and so determine whether the client has left the flat unaccompanied and whether a caretaker 15 should be alerted (step S4). If the primary server 7 finds that the flat 3 was multiply occupied, then it decides that the client left the flat accompanied. Thus, the primary server 7 takes no special action and events continue to be logged in the usual way (step S1). If, however, the primary server 7 finds that the flat was not multiply occupied, i.e. that the client was alone in the flat, then it alerts a caretaker 15 (step S5). The primary server 7 may alert the caretaker 15 by SMS.

Referring also to FIG. 18, the primary server 7 retrieves, from data server 9 or local storage, a prepared message and a number of the terminal 14 of the caretaker 15 for the client 2 (steps S5.1 & S5.2). The server 7 generates a script (step 5.3) and forwards the script to gateway 12 to be sent to the terminal 14 of the caretaker 15 (step S5.4).

The caretaker 15 can take action to intercept or find the client 2 before they wander too far. The caretaker 15 is more likely to act immediately on receiving the notification because they are less likely to receive false as a result of the system 1 screening exit events using multiple occupancy.

It will be appreciated that many modifications may be made to the embodiments hereinbefore described. For example, data can be accumulated and categorised and, thus, serve as the basis for a training set and for further refining distribution parameters. This can continue until a predetermined level of convergence was reached. The method can be used to monitor other forms of subject in other environments for security or safety purposes. Distributions other than Poisson and normal distributions may be used to model a set of data. In some embodiments, the method may be run retrospectively, on a stored set of data. Notification can be sent to a server, rather than a communication terminal. The notification may be a sound alert or may include audio, image and/or video content, such as a recorded voice. The process may be adapted to identify different levels of occupancy, for example between double and triple occupancy.

What is claimed is:

1. A method of monitoring movement of an entity in an environment having at least one point of access, the method comprising:

using a monitoring unit having a processor in communication with at least one sensor disposed to detect activity associated in a predetermined environment to: identify an event indicating opening of a point of access to said environment; determine if the environment was occupied by more than one entity prior to the event; and send a notification to a terminal dependent upon if the environment was occupied by more than one entity prior to the event, wherein determining if the environment was occupied by more than one entity prior to the event includes:

calculating a probability that the environment is occupied by more than one entity; and comparing the probability with a predetermined threshold probability.

2. A method according to claim 1, wherein determining if the environment was occupied by more than one entity prior to the event includes:

determining if the environment was occupied by more than one entity during at least a predetermined period immediately preceding the event.

3. A method according to claim 1, further comprising: using said monitoring unit to: determine if there is inactivity in the environment following the access point opening, wherein sending the notification to the terminal is dependent upon the determination of inactivity in the environment following the access point opening.

4. A method of monitoring movement of an entity in an environment having at least one point of access, the method comprising:

using a monitoring unit having a processor in communication with at least one sensor disposed to detect activity associated in a predetermined environment to: identify an event indicating opening of a point of access to said environment; determine if the environment was occupied by more than one entity prior to the event; and send a notification to a terminal dependent upon if the environment was occupied by more than one entity prior to the event, wherein determining if the environment was occupied by more than one entity prior to the event includes: providing a frequency of a first type of event occurring in the environment prior to the event; providing a first set of parameters for describing a frequency distribution of the first type of event occurring in the environment associated with movement of only one entity in the environment; providing a second set of parameters for describing a frequency distribution of the first type of event occurring in the environment associated with movement of more than one entity in the environment; calculating a probability, P(EISO), of the first type of event occurring with said frequency given only one entity in the environment; calculating a probability, P(EIMO), of the first type of event occurring with said frequency given more than one entity in the environment; providing a probability, P(MO), of there being more than entity in the environment; and calculating a probability, P(MOIE), of there being more than one entity in the environment given the first type of event occurring using:

$$P(MO \mid E) = \frac{P(MO)P(E \mid MO)}{P(E \mid SO) + P(E \mid MO)}.$$

5. A method according to claim 4, wherein the first type of event is detection of movement simultaneously in two, different areas of the environment.

6. A method according to claim 4, wherein determining if the environment was occupied by more than one entity prior to the event includes:

providing a frequency of a second type of event occurring in the environment prior to the event; providing a first set of parameters for describing a frequency distribution of the second type of event occurring in the environment associated with movement of only one entity in the environment; providing a second set of parameters for describing a frequency distribution of the second type of event occurring in the environment associated with movement of more than one entity in the environment;

calculating a probability, P'(EISO), of the second type of event occurring with said frequency given only one entity in the environment;

calculating a probability, P'(EIMO), of the second type of event occurring with said frequency given more than one entity in the environment;

using the probability, P(MOIE), of there being more than one entity in the environment given the first type of event occurring as a new probability, P'(MO), of there being more than entity in the environment; and calculating a new probability, P'(MOIE), of there being more than one entity in the environment given the first and second types of event occurring using:

$$P'(MO \mid E) = \frac{P'(MO)P'(E \mid MO)}{P'(E \mid SO) + P'(E \mid MO)}.$$

7. A method according to claim 6, wherein the second type of event is: detection of movement from one area to another, non-adjoining area in the environment; detection of movement in the environment; or detection of movement from one area to another.

8. A method according to claim 1, further comprising: using said monitoring unit to receive data from a plurality of means for detecting motion, each motion detecting means positioned to detect movement in a respective area of the environment.

9. A method according to claim 1, further comprising:

using said monitoring unit to receive data from at least one means for detecting state of the point of access.

10. A method according to claim 1, wherein the entity is a person and the environment is a dwelling.

11. A method according to claim 1, wherein identifying the event indicating opening of the point of access comprises identifying the event in real time.

12. A method according to claim 1, wherein identifying the event indicating opening of the point of access comprises identifying the event in a stored set of data.

13. A method according to claim 1, wherein sending the notification to a terminal comprises sending a notification to a communications terminal.

14. A computer-readable storage medium containing computer program code which, when executed by data processing apparatus, causes said data processing apparatus to perform the method according to claim 1.

15. A system for monitoring movement of an entity in an environment having at least one point of access, the system comprising:

means for identifying an event indicating opening of a point of access;

means for determining if the environment was occupied by more than one entity prior to the event: means for sending a notification to a terminal dependent upon if the environment was occupied by more than one entity prior to the event;

means for calculating a probability that the environment is occupied by more than one entity; and means for comparing the probability with a predetermined threshold probability.

16. A system according to claim 15, comprising: a plurality of means for detecting motion in respective areas of the environment; at least one means for detecting status of the point of access; and a communication node for communicating data received from the motion detecting means and access point state detecting means to a network.

17. A system according to claim 16, comprising: a first server; and a second server; wherein the first server is configured to receive data from the communication node, to identify in said data the event indicating the opening of the access point and to send a request to the second server to determine a probability that the environment is occupied by more than one entity.

18. A system according to claim 16, comprising: a first server; and a data server; wherein the first server is configured to receive data from the communication node and to forward the data to the data server for storage.

19. A system for monitoring movement of an entity in an environment having at least one point of access, the system comprising a server which includes:

an interface for receiving notification of an event indicating opening of a point of access; and a processor configured to determine if the environment was occupied by more than one entity prior to the event and to send a notification to a terminal dependent upon if the environment was occupied by more than one entity prior to the event, wherein the processor is further configured to provide a probability that the environment is occupied by more than one entity and to compare the probability with a predetermined threshold probability.

20. A system according to claim 19, wherein the processor is further configured to calculate the probability that the environment is occupied by more than one entity.

21. A system according to claim 19, further comprising another server, said other server including a processor configured to calculate the probability that the environment is occupied by more than one entity.

22. A method as in claim 1, wherein multiple occupancy is determined by: sensing activity events in a plurality of zones in said environment; and comparing the sensing of events in different ones of said plurality of zones.

23. A system as in claim 15, means for sensing activity events in a plurality of zones in said environment; and means for comparing the sensing of events in different ones of said plurality of zones.

* * * * *